W. LATHAM.
APPARATUS FOR MOLDING ICE CAKES.
APPLICATION FILED DEC. 21, 1914.
1,166,770.
Patented Jan. 4, 1916.
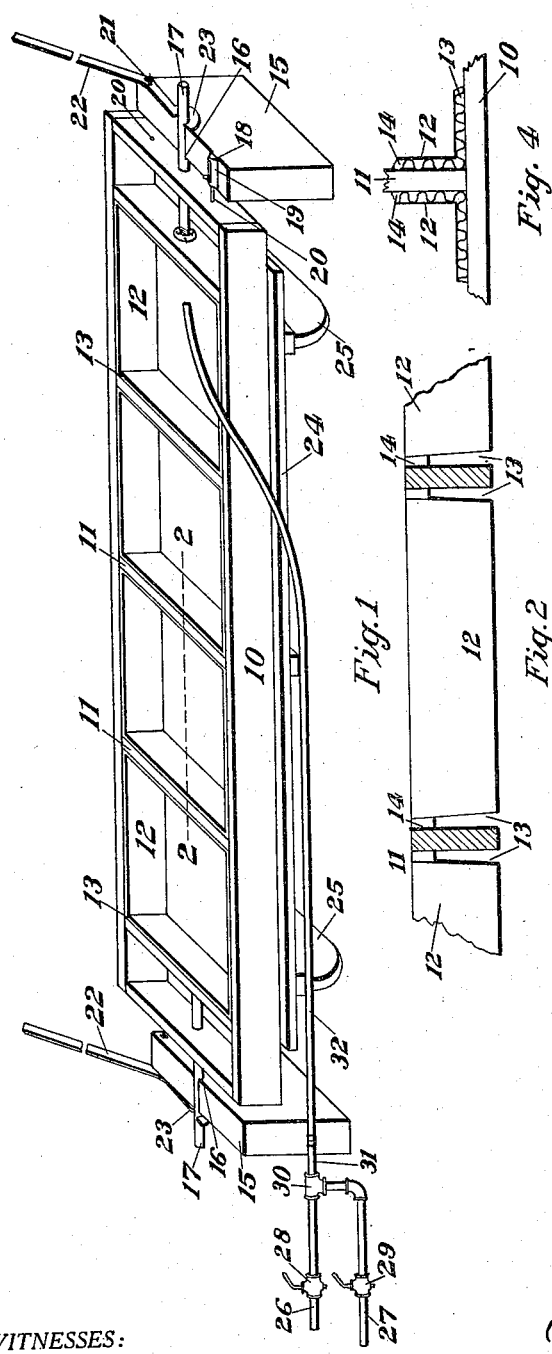
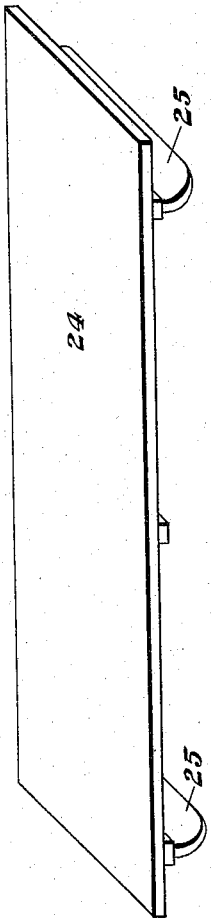

UNITED STATES PATENT OFFICE.

WARREN LATHAM, OF SPOKANE, WASHINGTON.

APPARATUS FOR MOLDING ICE CAKES.

1,166,770.  Specification of Letters Patent.  Patented Jan. 4, 1916.

Application filed December 21, 1914. Serial No. 878,278.

*To all whom it may concern:*

Be it known that I, WARREN LATHAM, a citizen of the United States of America, residing at Spokane, in the county of Spokane and State of Washington, have invented certain new and useful Improvements in Apparatus for Molding Ice Cakes, of which the following is a specification.

This invention pertains to apparatus for molding ice cakes to be frozen by natural temperature, and has for its object to provide local means for accumulating and putting up ice, thereby saving the cost of transporting the same.

The apparatus comprises generally, pans in which water is run and allowed to freeze, means for filling the pans, means for thawing the ice loose from the pans and means for emptying the pans of the ice cakes and conveying the same away.

The apparatus will be hereinafter particularly described and illustrated in the accompanying drawings, in which—

Figure 1, is a perspective view of the complete apparatus, Fig. 2, is a broken-away sectional view taken on the line 2—2 of Fig. 1, Fig. 3, is a detail view of a movable table used in connection with said apparatus, and Fig. 4 is a broken-away top plan view of Fig. 1.

An open frame 10 without top or bottom is provided across which are partitions 11. Between the partitions 11 are stationed pans 12 having closed sides and bottom and an open top. Around the edges of the pans 12 and between the same and the frame 10 and the partitions 11 are open spaces 13, a connecting means between the pans 12 and the frame 10 and the partitions 11 being provided in the nature of a corrugated sheet of metal 14 set in an upright position to permit of the free passage of air or steam through the space 13 as a convenient means of reaching the sides of the pans to melt the ice loose therefrom. At the ends of the frame 10 are brackets or supports 15 in which are provided bearings 16. Centrally secured to the ends of the frame 10 are shafts 17 rotatably mounted in the bearings 16. Secured to one of the supports 15 is a bolt 18 slidably mounted in a bearing 19 and which engages an opening 20 in the end of the frame 10. Pivoted to the supports 15, as at 21, are levers 22 having bearings 23 engaging the shafts 17. Adapted for occupying a position beneath the frame 10 is a table 24, mounted on runners 25. Extended to a point near the frame 10 are pipes 26 and 27, the former leading to a source of water supply and the latter leading to a source of steam supply. The pipe 26 carries a valve 28 and the pipe 27 a valve 29. The two pipes 26 and 27 are joined together beyond the said valves, as at 30, so that the two have a common outlet 31. To this common outlet 31 is attached a flexible conduit or hose 32. When it is desired to operate the device, the valve 28 in the water pipe 26 is opened and the hose 32 turned into the pans 12 and the pans filled with water, when the valve 28 is closed. The water in the pans 12 is allowed to set a sufficient time to allow the same to freeze over the top and around the edge to a sufficient thickness to hold together. The frame 10 is then manually turned upside down, the table 24 inserted under the frame 10 and the valve 29 in the steam pipe 27 opened, and the hose 32 turned onto and around the pans 12 to melt the ice loose from the pans, when the same will drop upon the table 24. The levers 22 will then be manually operated to raise the frame 10. The table 24 is then run away with the ice cakes, which are piled up and allowed to freeze solid. The frame 10 is then turned right side up and the pans refilled with water to freeze in like manner as above described when the frame 10 will be again inverted. The table 24 is again placed in its position underneath the frame 10 and used in the manner described. The bolt 19 is slid to engagement with the opening 20 in the end of the frame 10 to hold the frame in a horizontal position while containing water.

What is claimed is,

1. An apparatus for freezing ice cakes by natural temperature comprising a frame having open top and bottom, partitions across the frame, pans having closed sides and bottom and open top set into the frame between the partitions, a filler of corrugated material between the frame and partitions and the pans, said frame mounted on shafts adapted to rotate and means for elevating and rotating the frame.

2. An apparatus for freezing ice cakes by natural temperature comprising a frame having open top and bottom, partitions across the frame, pans having closed sides and bottom and open top set into the frame between the partitions, a filler of corrugated material between the frame and partitions and the pans, said frame mounted on shafts adapted to rotate, means for elevating and rotating the frame and means for filling said pans with water and means for applying steam to the surface of said pans to loosen frozen ice cakes therein.

3. An apparatus for freezing ice cakes by natural temperature comprising a frame having open top and bottom, partitions across the frame, pans having closed sides and bottom and open top set into the frame between the partitions, a filler of corrugated material between the frame and partitions and the pans, said frame mounted on shafts adapted to rotate, means for elevating and rotating the frame, a removable table underneath said frame, means for filling said pans with water and means for applying steam to the surface of said pans to loosen frozen cakes of ice therein.

In testimony whereof I affix my signature in presence of two witnesses.

WARREN LATHAM.

Witnesses:
H. M. WILEY,
L. L. WESTFALL.

Copies of this patent may be obtained for five cents each, by addressing the "Commissioner of Patents, Washington, D. C."